United States Patent
Holmes et al.

(10) Patent No.: US 7,190,312 B2
(45) Date of Patent: Mar. 13, 2007

(54) RF TEST ACCESS FOR TESTING ANTENNA IN MOBILE COMMUNICATION DEVICE

(75) Inventors: John A. Holmes, Waterloo (CA); Yihong Qi, Waterloo (CA)

(73) Assignee: Research In Motion Limited, Waterloo (CA)

( * ) Notice: Subject to any disclaimer, the term of this patent is extended or adjusted under 35 U.S.C. 154(b) by 38 days.

(21) Appl. No.: 11/046,716

(22) Filed: Jan. 31, 2005

(65) Prior Publication Data
US 2006/0001578 A1    Jan. 5, 2006

Related U.S. Application Data

(60) Provisional application No. 60/585,126, filed on Jul. 2, 2004.

(51) Int. Cl.
*H01Q 1/24*    (2006.01)
(52) U.S. Cl. .................................. 343/702; 343/872
(58) Field of Classification Search ............... 343/702, 343/906, 872; 455/575.7, 550
See application file for complete search history.

(56) References Cited

U.S. PATENT DOCUMENTS 6,501,960 B1    12/2002    Jensen et al.
6,978,165 B2 *  12/2005    Martinez et al. ......... 455/575.7
2002/0002059 A1 * 1/2002   Johnson ..................... 455/550
2002/0118136 A1  8/2002    Gushiken
2002/0127971 A1  9/2002    Chen et al.

FOREIGN PATENT DOCUMENTS

EP    1 134 591 A1    9/2001
EP    1 168 496 A2    1/2002

* cited by examiner

*Primary Examiner*—Hoang V. Nguyen
(74) *Attorney, Agent, or Firm*—Jones Day; Krishna K. Pathiyal; Robert C. Liang

(57) ABSTRACT

A housing 26 for a mobile communication device 10 includes a housing member 58 that encloses the mobile communication device 10. An opening 54 is positioned in the housing member 58 for accepting a battery 68. A door 56 is positioned over the opening 54 in the housing member 58, with an access port 50 defined through the housing member 58 positioned under the door 56 for contacting an internal element 52 of a mobile communication device 10, such as an antenna 52. A method for testing an antenna 52 in a mobile communication device 10 having a housing 26 with an antenna access port 50 defined therethrough, an antenna 52, a battery compartment 54, and a removable cover positioned over at least part of the housing 26 is also described.

17 Claims, 8 Drawing Sheets

RF TEST ACCESS FOR TESTING ANTENNA IN MOBILE COMMUNICATION DEVICE

CROSS-REFERENCE TO RELATED APPLICATION

This application claims priority to U.S. Provisional Application No. 60/585,126, filed on Jul. 2, 2004, the disclosure of which is incorporated herein by reference in its entirety.

FIELD

This technology relates to a test access port for testing an antenna in a mobile communication device.

BACKGROUND

Mobile communication devices include an antenna for communication with wireless networks. This antenna must be tested before the mobile communication device leaves the factory to insure that the antenna is installed properly and in proper working order.

There are several different methods for testing mobile communication devices during assembly. One method is to conduct a two part test, where the circuit board and antenna are tested first and then a second and final test checks the entire device. Where a two part test is utilized, the housing of the device is often installed after the first test is performed so that access to the antenna is available.

Another method is to conduct a single final test where all components are tested with the housing in place. In this case, it is necessary to have access to the antenna in order to test it.

Most phones utilize an antenna that is positioned near the top of the mobile communication device. An RF test port is positioned at the top of the device, usually on the back of the device in the form of a hole in the back housing plastic. The hole allows for an RF probe to connect to the antenna for testing. This hole requires a plug to be positioned in the hole after testing so that the consumer cannot see the RF test port and to avoid the unwanted entry of dirt or debris into the housing through the port. The plug is an extra part that adds costs and an additional assembly step. Prior devices, such as those of Motorola, Trium, and Qualcom, depicted in FIGS. 1–3, respectively, have utilized an external test port 8 through the housing of the device that is plugged with a plug or stopper.

SUMMARY

In accordance with the teachings described herein, a housing for a mobile communication device includes a housing member and a door. The housing member encloses the mobile communication device, with at least one opening positioned in the housing member for accepting a battery. The door is positioned over the opening in the housing member, with an access port defined through the housing member positioned under the door for contacting an internal element of a mobile communication device.

In another example, a housing for a mobile communication device includes a housing member, a first cover, and a second cover. The housing member has an opening for receiving a battery into a mobile communication device and an access port for testing an antenna. The first cover is positioned over at least part of the housing member covering the access port. The second cover is positioned over at least part of the housing member covering the battery. The first and second covers may be one in the same.

In another example, a mobile communication device includes the housing described above and an antenna positioned inside the housing member in the vicinity of the bottom of the housing member in association with the access portion.

In a further example, a method for testing an antenna in a mobile communication device is described. The mobile communication device has a housing with an antenna access port defined therethrough, an antenna, a battery compartment, and a removable cover positioned over at least part of the housing. The method includes removing the cover from the housing, inserting a test probe into the antenna access port, which is positioned under the cover, and contacting a portion associated with the antenna utilizing the probe for conducting testing of the antenna. The method also includes removing the test probe and reinstalling the cover on the housing.

BRIEF DESCRIPTION OF THE DRAWING FIGURES

DETAILED DESCRIPTION

Figure 1:
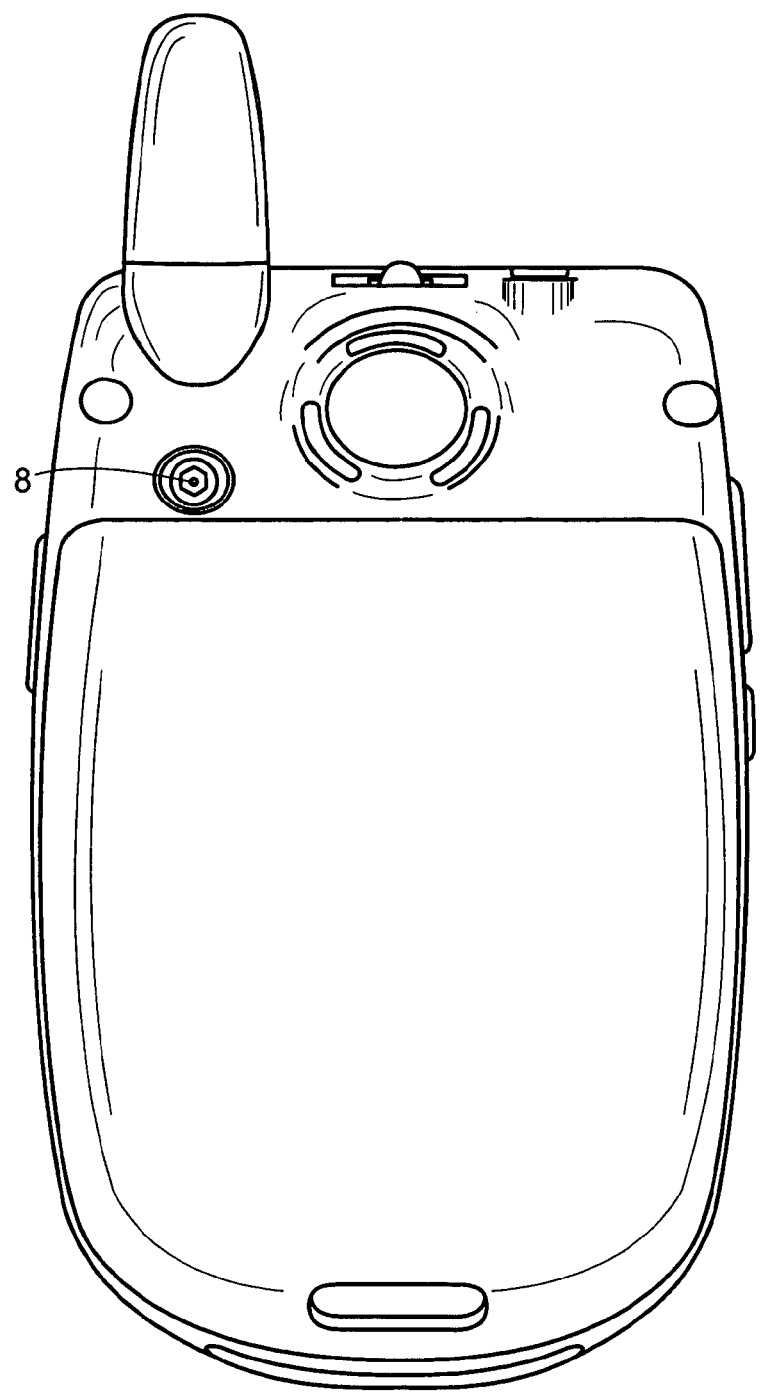
FIG. 1 is a back view of a prior art mobile communication device.
Figure 2:
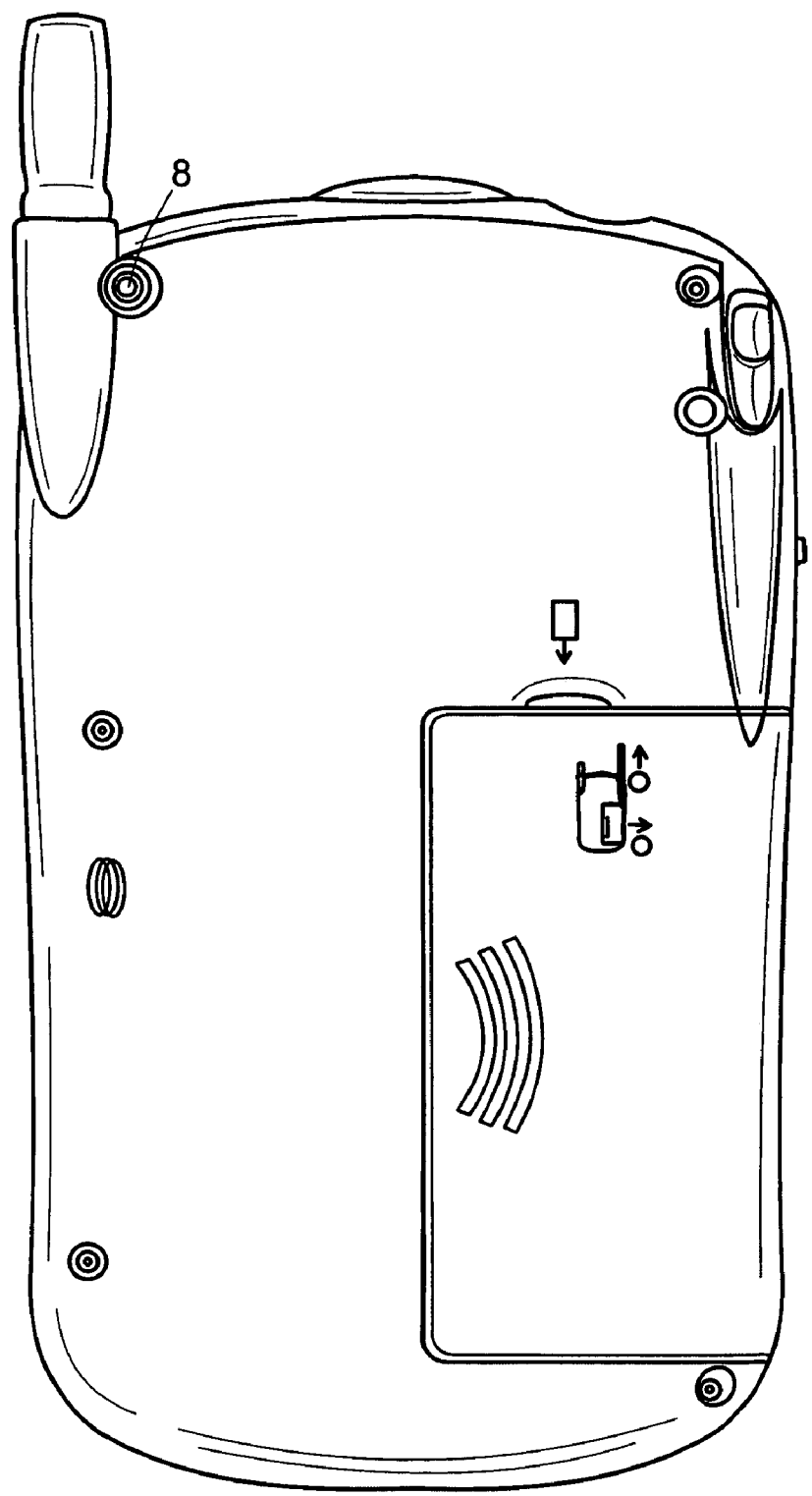
FIG. 2 is a back view of a prior art mobile communication device.
Figure 3:
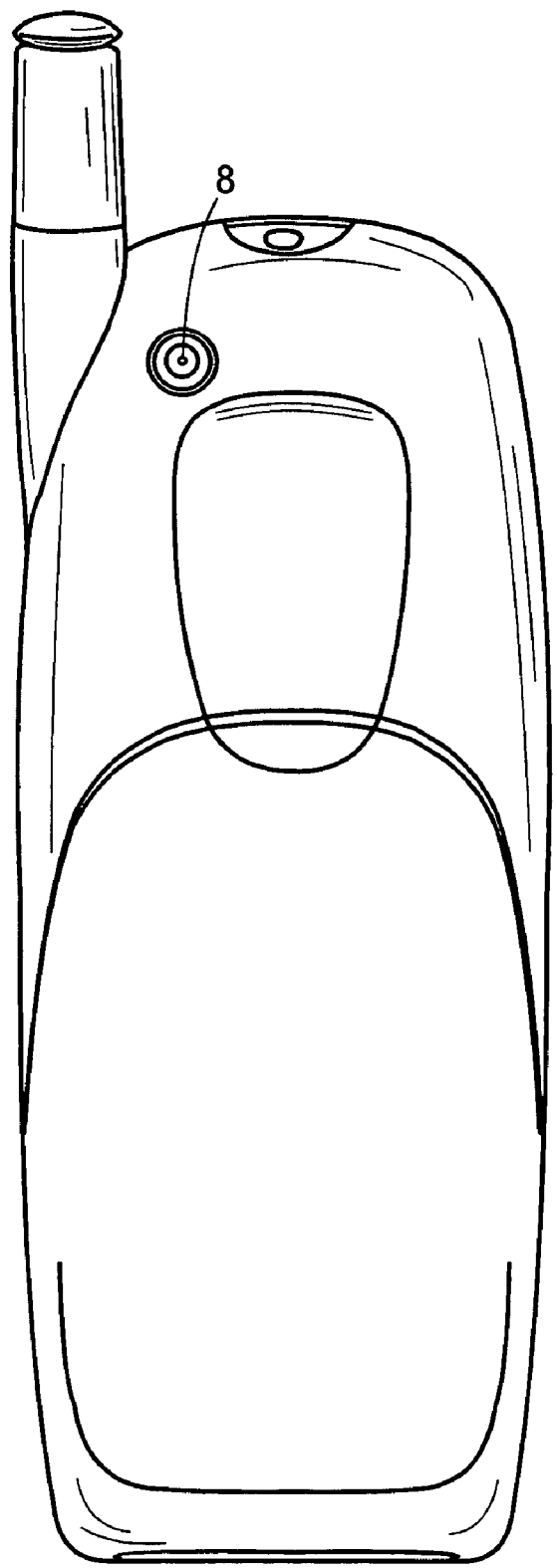
FIG. 3 is a back view of a prior art mobile communication device.

With reference now to FIGS. 4–7, a rear view of an example mobile communication device 10 is depicted in various states of disassembly. An RF test access port 50 is shown positioned on the rear of the mobile communication device 10 in the vicinity of the antenna 52, which in this embodiment is positioned at the bottom of the device. By positioning the antenna at the bottom of the device, the antenna 52 is positioned near the battery compartment 54 and the battery compartment door 56 is designed so that the antenna lies underneath the battery door. The battery door 56 serves to cover the access port 50. Because the door 56 covers the access port 50, a separate plug is not needed to close the port 50.

Figure 4:
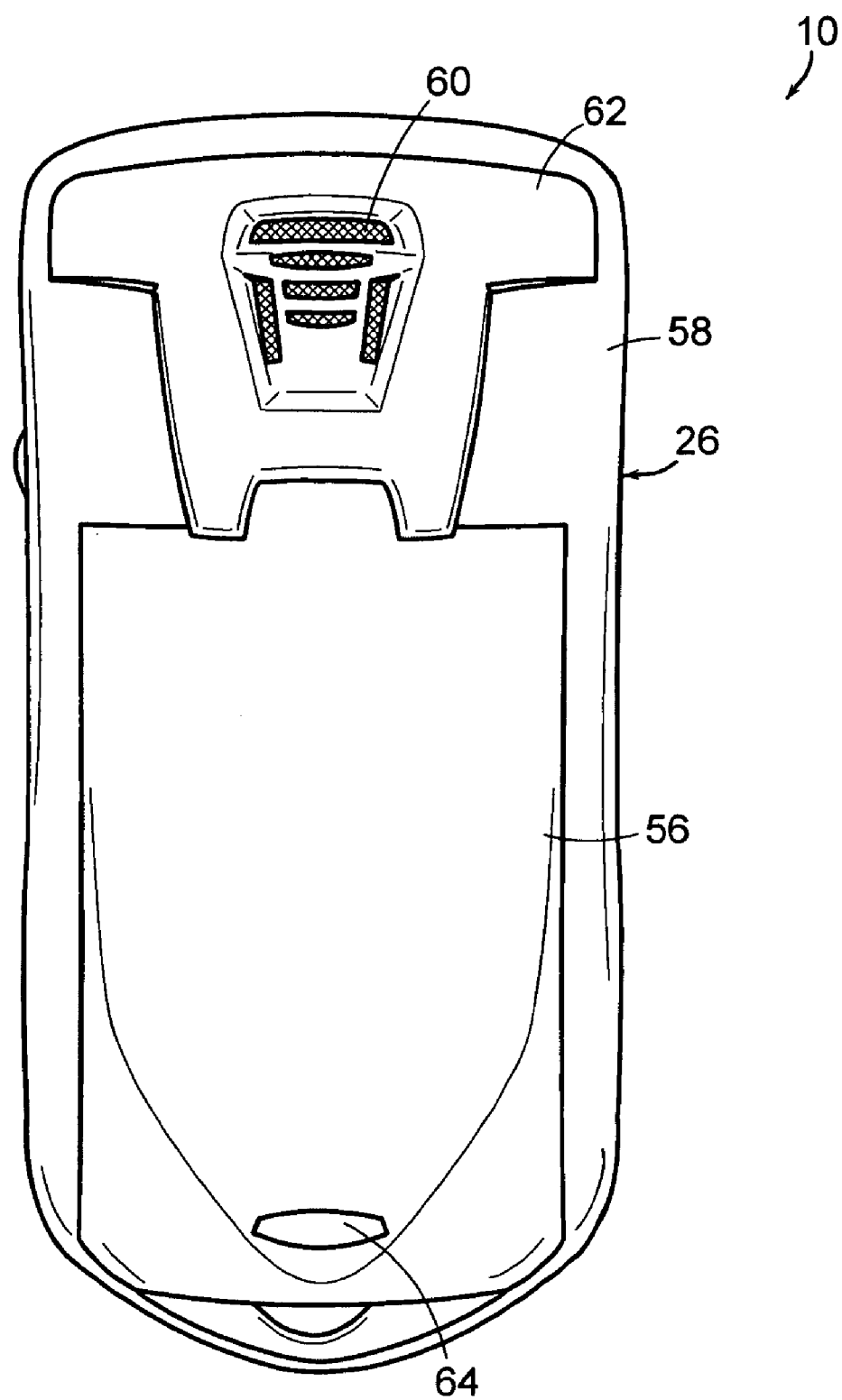
FIG. 4 is a back view of an example mobile communication device.

FIG. 4 shows a rear housing 58 of a mobile communication device 10 with a speaker 60 and speaker cover 62 positioned at the top of the device and the battery door 56 positioned below the speaker cover 62. The battery door 56 has a latch 64 for opening and closing the battery compartment 54, which is positioned under the battery door 56.

Figure 5:
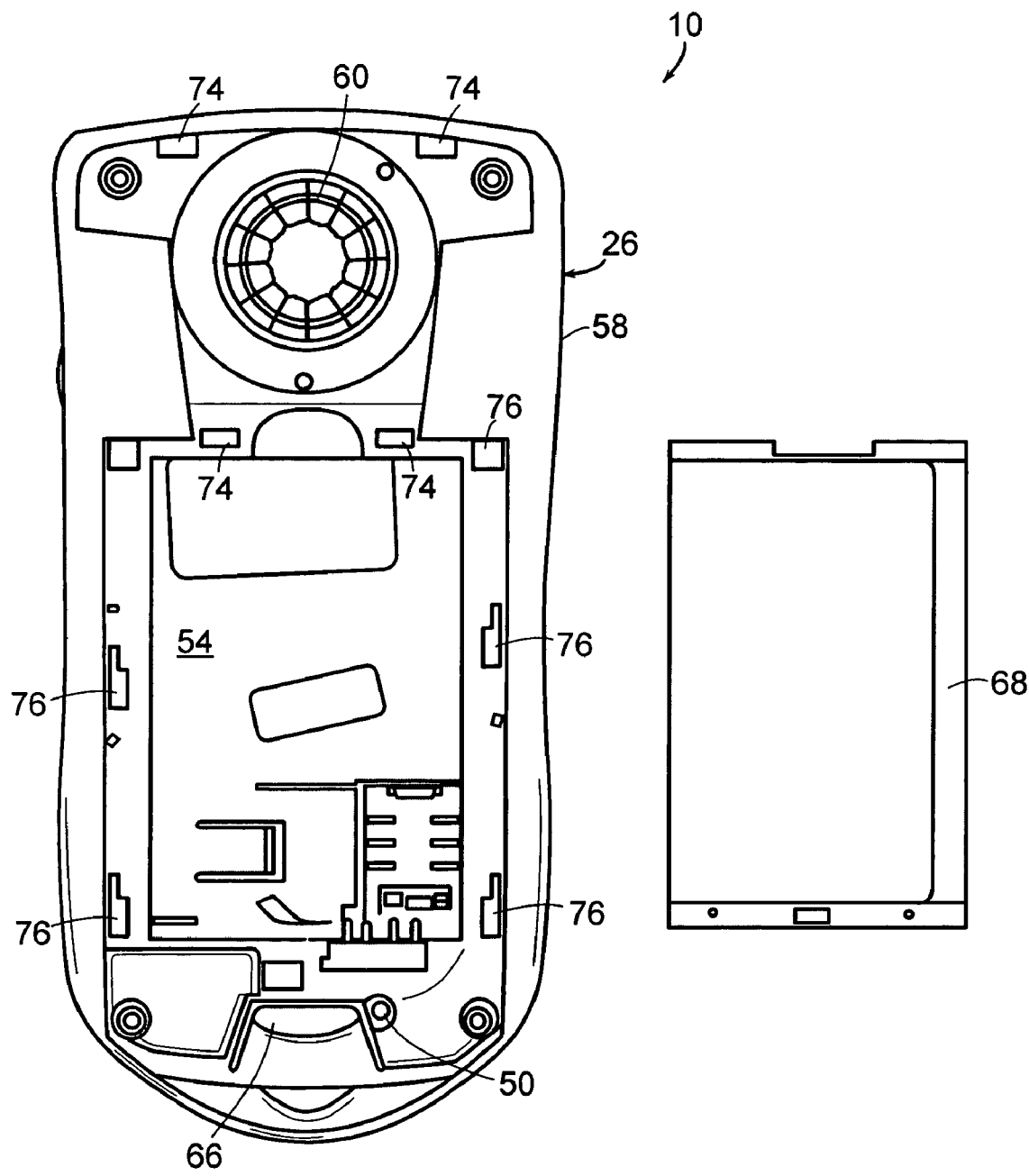
FIG. 5 is an open back view of the device of FIG. 4 showing the battery positioned beside the device.

FIG. 5 depicts the example mobile communication device 10 with the speaker cover 62 and battery door 56 removed. In addition, the battery 68 is removed and shown positioned beside the device 10. The housing includes a latch member 66 at the bottom of the rear housing 58 for mating with a latch 64 of the battery door 56 to latch the door in position over the battery compartment 54. The antenna access port 50 is positioned adjacent the latch member 66 and comprises a hole that extends through the housing to the antenna 52. The hole is preferably round, but may be other shapes.

Figure 6:
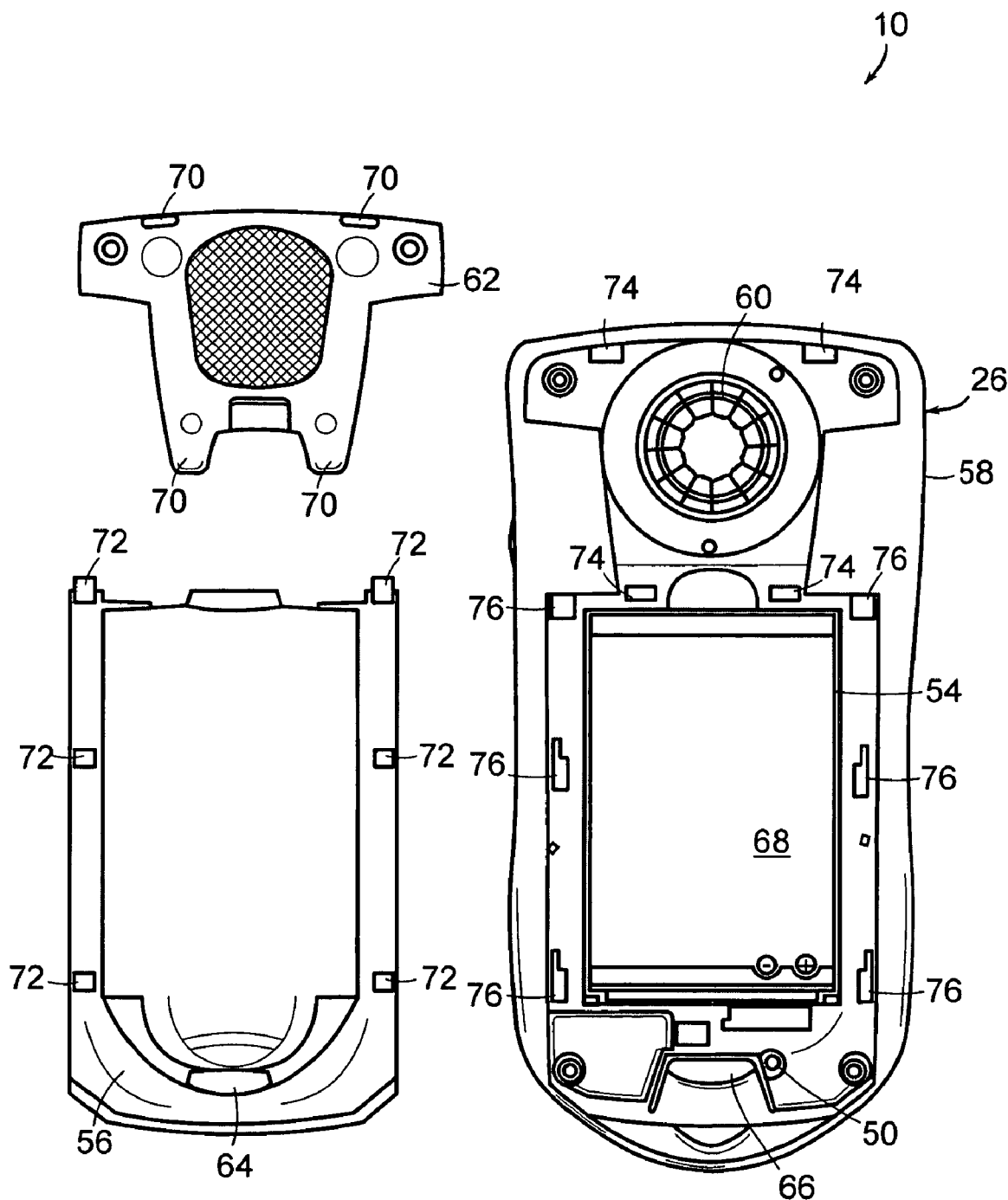
FIG. 6 is an open back view of the device of FIG. 4 with the battery in an installed position, but with the battery door and speaker door shown.
Figure 7:
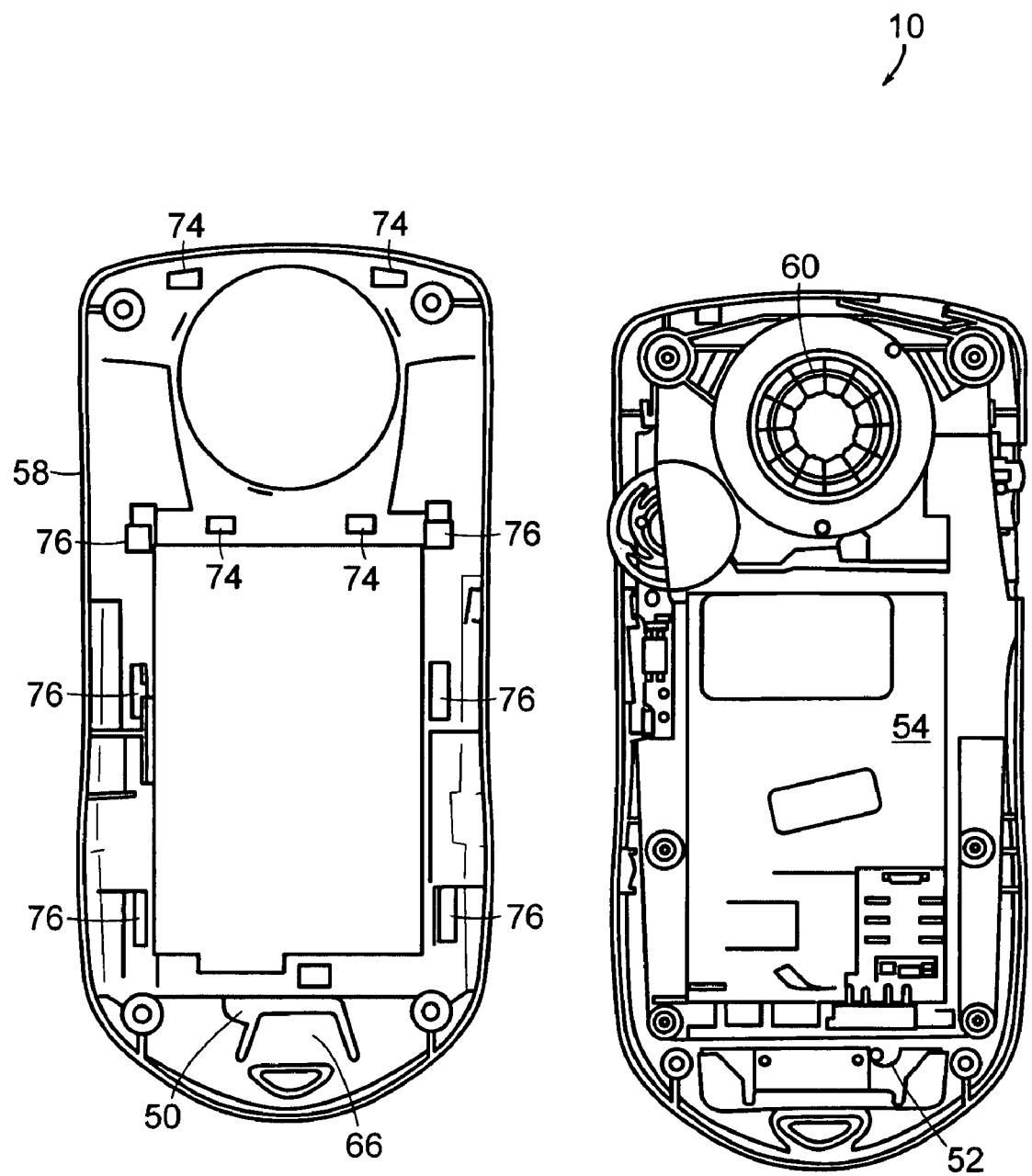
FIG. 7 is a back view of the device of FIG. 4 with the rear part of the housing removed.

FIG. 6 is a view of the device similar to FIG. 5, but showing the battery 68 installed in the battery compartment 54. The battery door 56 and speaker cover 62 are positioned beside the mobile communication device 10. Both the battery door 56 and the speaker cover 62 have legs 70, 72 that couple with openings 74, 76 on the housing. The legs 70 of the speaker cover 62 snap the cover 62 into place while the legs 72 of the battery door 56 slide into the openings 76 of the housing. FIG. 7 is a rear view of the example device 10 with the rear housing 58 removed to reveal the inner elements of the device 10. The antenna 52 is positioned at the bottom of the device 10.

By having the antenna access port 50 accessible under the battery door 56, the mobile communication device 10 only needs to be tested once, during a final test, and the dual testing, described above in the background section, is thereby avoided. The design is desirable because it utilizes an existing part of the housing to cover the access port 50, saving material and assembly costs.

The access port 50 may be utilized on any kind of mobile communication device 10 including small, hand-held electronic mobile communication devices, such as mobile stations, cellular telephones, wireless personal digital assistants (PDAs), personal information managers (PIMs), two-way paging devices, and others. Any type of mobile communication device 10 may be utilized with the example antenna access port 50.

While the access port 50 is shown positioned under the battery door 56, it could alternatively be positioned under another door, such as the speaker cover 62. It is not critical that the antenna 52 be positioned at the bottom of the device 10. Other locations for the access port 50 are also possible, as long as a door is configured to hide the port 50. For example, if the antenna 52 were positioned near the top of the device 10, an access port 50 could be positioned under the top end of the battery door 56 or under the speaker cover 62. The battery door 56 could be further elongated to cover part or all of the upper end of the device 10 so that the antenna access port 50 continues to be accessible under the battery door 56. It is preferred that the port 50 be positioned under an existing door.

A method for testing an antenna in the mobile communication device 10 discussed above includes removing the cover 56 from the housing 26 and inserting a test probe (not shown, but known to those of skill in the art) into the antenna access port 50 that is located under the cover 56. The probe is used to contact a portion of the antenna 52 for conducting testing of the antenna 52. The test probe is then removed and the cover 56 is reinstalled on the housing 26 of the mobile communication device 10.

Figure 8:
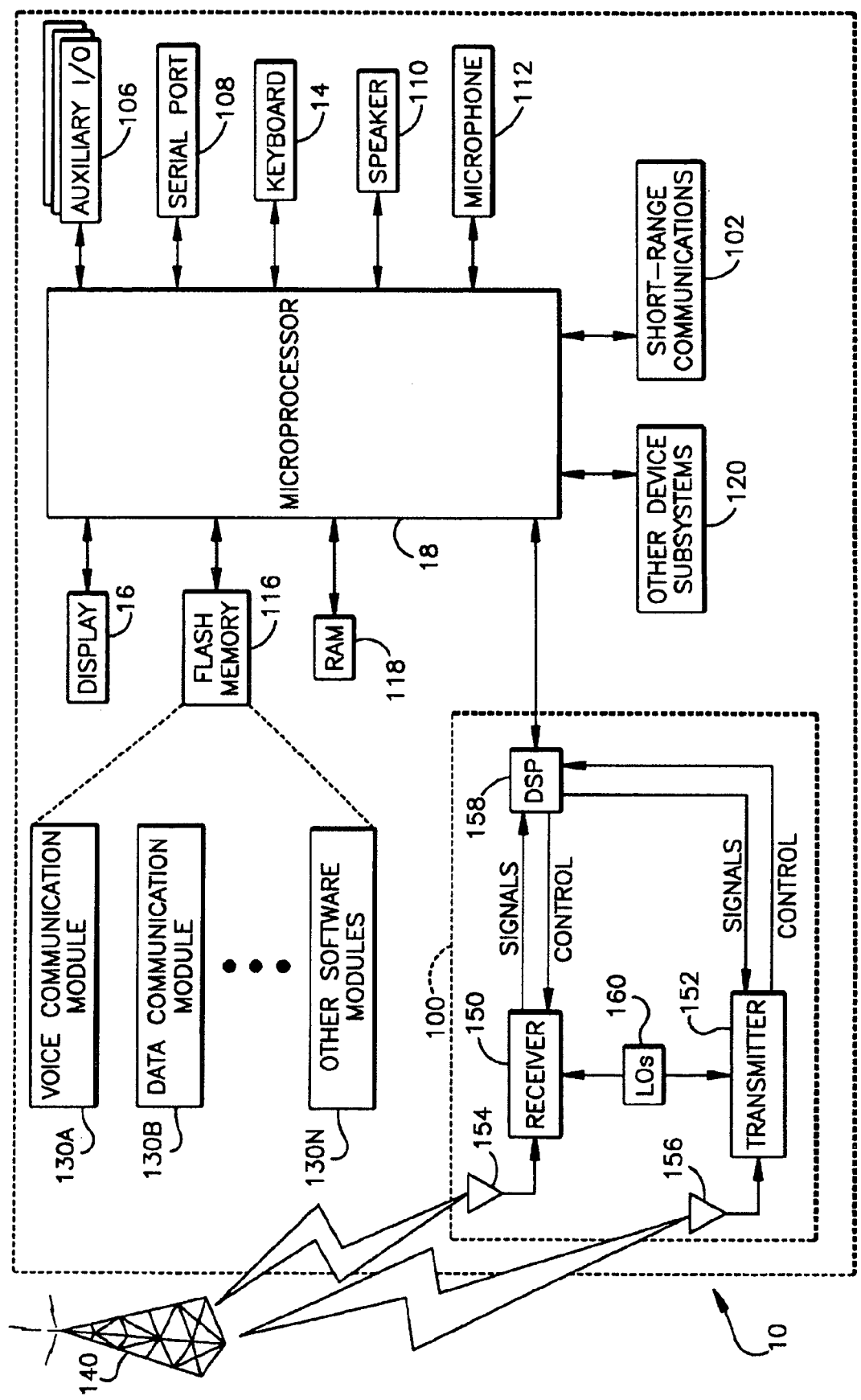
FIG. 8 is a block diagram illustrating an example mobile communication device system

Referring to FIG. 8, handheld mobile communication devices 10 include similar features, such as a housing 26, a keyboard 14 and a display 16. The display is preferably a full graphic LCD. Other types of output devices may alternatively be utilized. A processing device 18, which is shown schematically in FIG. 8, is contained within the housing 26 and is coupled between the keyboard 14 and the display 16. The processing device 18 controls the operation of the display 16, as well as the overall operation of the mobile communication device 10, in response to actuation of keys on the keyboard 14 by the user.

The housing 26 may be elongated vertically, or may take on other sizes and shapes. The keyboard may include a mode selection key, or other hardware or software for switching between text entry and telephony entry.

In addition to the processing device 18, other parts of the mobile communication device 10 are shown schematically in FIG. 8. These include a communications subsystem 100; a short-range communications subsystem 102; the keyboard 14 and the display 16, along with other input/output devices 106, 108, 110 and 112; as well as memory devices 116, 118 and various other device subsystems 120. The mobile communication device 10 is preferably a two-way RF communication device having voice and data communication capabilities. In addition, the mobile communication device 10 preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 18, in addition to its operating system functions, enables execution of software applications 130A–130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 100, and possibly through the short-range communications subsystem 102. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 10 is intended to operate. For example, a mobile communication device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc.

Other types of data and voice networks, both separate and integrated, may also be utilized with the mobile communication device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem 102 enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

While various features of the claimed embodiments are presented above, it should be understood that the features may be used singly or in any combination thereof. Therefore, the claimed embodiments are not to be limited to only the specific embodiments depicted herein.

Further, it should be understood that variations and modifications may occur to those skilled in the art to which the claimed embodiments pertains. The embodiments described herein are exemplary. The disclosure may enable those skilled in the art to make and use embodiments having alternative elements that likewise correspond to the elements recited in the claims. The intended scope may thus include other embodiments that do not differ or that insubstantially differ from the literal language of the claims. The scope of the example embodiments is accordingly defined as set forth in the appended claims.

What is claimed is:

1. A housing for a mobile communication device comprising:
    a housing member that encloses the mobile communication device, with an opening positioned in the housing member for accepting a battery; and
    a battery compartment door positioned over the said opening in the housing member, with an access port defined through the housing member positioned under the battery compartment door for contacting an internal element of a mobile communication device, wherein the access port is positioned under the battery compartment door in a location other than in said opening for the battery.

2. The housing of claim 1, wherein the internal element of a mobile communication device is an antenna, the antenna is positioned at a bottom end of the housing member, and the access port is configured to allow access to the antenna for at least testing purposes.

3. The housing of claim 1, wherein the housing member includes a latch member and the door includes a latch that is configured to engage with the latch member to hold the door in position, and the access port is positioned adjacent the latch.

4. The housing of claim 3, wherein the latch member is defined in the vicinity of the bottom of the housing member and the latch is defined in the vicinity of the bottom of the door.

5. The housing of claim 1, wherein the housing member comprises a front housing member and a rear housing member, with the opening being positioned in the rear housing member, the opening being a battery compartment, and the door being configured to cover the battery compartment.

6. The housing of claim 1, wherein the access port is round.

7. A mobile communication device comprising:
    the housing of claim 1;
    an antenna positioned inside the housing member in the vicinity of the bottom of the housing member in association with the access port.

8. The mobile communication device of claim 7, further comprising a battery positioned in the opening.

9. A housing for a mobile communication device comprising:
    a housing member, said housing member having an opening for receiving a battery into a mobile communication device and an access port for testing an antenna;

a first cover positioned over at least part of the housing member covering the access port and at least another portion of the housing member; and a second cover positioned over at least part of the housing member covering the battery, wherein the first and second covers are formed as a single cover.

10. The housing of claim 9, wherein the first and second covers include at least one of legs for mating with orifices defined on the housing member, or a latch for mating with a corresponding latch member defined on the housing member.

11. The housing of claim 9, wherein the housing member comprises a front housing member and a rear housing member, with the cover being associated with the rear housing member for covering the battery and the access port.

12. The housing of claim 11, wherein the housing member is configured to accept an antenna in the vicinity of the bottom of the housing member.

13. A mobile communication device comprising:
   the housing of claim 9;
   a battery positioned in the opening; and
   an antenna positioned inside the housing in association with the access port.

14. A method for testing an antenna in a mobile communication device having a housing with an antenna access port defined therethrough, an antenna, a battery compartment, and a removable battery compartment cover positioned over at least part of the housing and the battery compartment, with the antenna access port positioned under the removable battery compartment cover in a location other than within the battery compartment comprising:
   removing the cover from the housing; inserting a test probe into the antenna access port, which is positioned under said cover;
   contacting a portion associated with the antenna utilizing the probe for conducting testing of the antenna;
   removing the test probe; and
   reinstalling said cover on the housing.

15. A housing for a mobile communication device comprising:
   a housing member that encloses the mobile communication device, with an opening positioned in the housing member for accepting a battery; and a battery compartment door positioned over said opening in the housing member, with an access port defined through the housing member positioned under said door for an antenna positioned at a bottom end of the housing member, with the access port being configured to allow access to the antenna for at least testing purposes.

16. A housing for a mobile communication device comprising:
   a housing member, said housing member having an opening for receiving a battery into a mobile communication device and an access port for testing an antenna;
   a first cover positioned over at least part of the housing member covering the access port; and
   a second cover positioned over at least part of the housing member covering the battery, wherein the first and second covers are formed as a single cover, the housing member comprises a front housing member and a rear housing member, with the single cover being associated with the rear housing member for covering the battery and the access port, and the housing member is configured to accept an antenna in the vicinity of the bottom of the housing member.

17. A mobile communication device comprising:
   a housing having a housing member that encloses the mobile communication device, with an opening positioned in the housing member for accepting a battery; and
   a battery compartment door positioned over said opening in the housing member, with an access port defined through the housing member positioned under said door; and
   an antenna positioned inside the housing member in the vicinity of the bottom of the housing member in association with the access port.

* * * * *

UNITED STATES PATENT AND TRADEMARK OFFICE
CERTIFICATE OF CORRECTION

| | | |
|---|---|---|
| PATENT NO. | : 7,190,312 B2 | Page 1 of 1 |
| APPLICATION NO. | : 11/046716 | |
| DATED | : March 13, 2007 | |
| INVENTOR(S) | : Holmes et al. | |

It is certified that error appears in the above-identified patent and that said Letters Patent is hereby corrected as shown below:

Column 6, line 24, please replace "over the said" with -- over said --

Column 7, line 26, please replace "therethiough" with -- therethrough --

Signed and Sealed this

Fifth Day of June, 2007

JON W. DUDAS
*Director of the United States Patent and Trademark Office*